(12) United States Patent
Ba et al.

(10) Patent No.: US 10,989,549 B2
(45) Date of Patent: Apr. 27, 2021

(54) ROUTE RECOMMENDATION IN MAP SERVICE

(71) Applicant: International Business Machines Corporation, Armonk, NY (US)

(72) Inventors: Yu Tao Ba, Beijing (CN); Chang Rui Ren, Beijing (CN); Xin Shi, Beijing (CN); Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 15/417,428

(22) Filed: Jan. 27, 2017

(65) Prior Publication Data
US 2018/0216948 A1    Aug. 2, 2018

(51) Int. Cl.
*G01C 21/34* (2006.01)
*G01C 21/36* (2006.01)

(52) U.S. Cl.
CPC ....... *G01C 21/3469* (2013.01); *G01C 21/343* (2013.01); *G01C 21/3667* (2013.01)

(58) Field of Classification Search
None
See application file for complete search history.

(56) References Cited

U.S. PATENT DOCUMENTS

| | | | | |
|---|---|---|---|---|
| 6,405,130 B1 * | 6/2002 | Piwowarski | ....... | G01C 21/3407 340/990 |
| 8,494,770 B2 * | 7/2013 | Forutanpour | ...... | G01C 21/3461 701/533 |
| 8,682,576 B2 | 3/2014 | Kurtti et al. | | |
| 9,008,888 B1 * | 4/2015 | Gravino | ............. | G01C 21/3682 701/26 |
| 9,299,251 B2 | 3/2016 | Scofield et al. | | |
| 9,803,990 B2 * | 10/2017 | Fletcher | ............. | G01C 21/3617 |
| 2002/0065604 A1 * | 5/2002 | Sekiyama | .......... | G01C 21/3476 701/426 |

(Continued)

FOREIGN PATENT DOCUMENTS

| | | |
|---|---|---|
| EP | 2899507 | 7/2015 |
| WO | 2015022558 | 2/2015 |

OTHER PUBLICATIONS

Yuan, J., et al., "Driving with Knowledge from the Physical World", Proceedings of the ACM SIGKDD, Aug. 21-24, 2011, pp. 1-9.

*Primary Examiner* — Nicholas K Wiltey
(74) *Attorney, Agent, or Firm* — Fleit Intellectual Property Law

(57) ABSTRACT

This disclosure involves improved route recommendation in map service. A computer-implemented method comprises identifying at least one intermediate point for traveling from an origin to a destination based on a user input. The method further comprises determining one or more first recommended routes from the origin to the destination via the at least one intermediate point. The method further comprises determining one or more second recommended routes from the origin to the destination without considering the at least one intermediate point. The method further comprises in response to at least one of the first recommended routes being better than the second recommended routes, storing the at least one intermediate point associated with the origin and the destination.

18 Claims, 5 Drawing Sheets

(56) References Cited

U.S. PATENT DOCUMENTS

| | | | |
|---|---|---|---|
| 2003/0069683 A1* | 4/2003 | Lapidot | G01C 21/34 701/117 |
| 2004/0225437 A1* | 11/2004 | Endo | G01C 21/34 701/415 |
| 2005/0125148 A1* | 6/2005 | Van Buer | G01C 21/3617 701/468 |
| 2005/0261822 A1* | 11/2005 | Wako | G01C 21/3682 701/438 |
| 2006/0167621 A1* | 7/2006 | Dale | G01C 21/3415 701/533 |
| 2007/0078596 A1* | 4/2007 | Grace | G01C 21/3476 701/533 |
| 2008/0071466 A1* | 3/2008 | Downs | G08G 1/0104 701/117 |
| 2008/0150765 A1* | 6/2008 | Nakajima | G07C 5/008 340/988 |
| 2008/0208462 A1* | 8/2008 | Tanaka | G01C 21/3453 701/414 |
| 2008/0243377 A1* | 10/2008 | Kimita | G08G 1/0104 701/424 |
| 2008/0249667 A1* | 10/2008 | Horvitz | B60W 40/072 701/1 |
| 2008/0275646 A1* | 11/2008 | Perng | G01C 21/3476 701/414 |
| 2010/0036606 A1* | 2/2010 | Jones | G01C 21/3446 701/533 |
| 2010/0125411 A1* | 5/2010 | Goel | G01C 21/3476 701/533 |
| 2010/0145609 A1* | 6/2010 | Boss | G01C 21/3469 701/22 |
| 2010/0312466 A1* | 12/2010 | Katzer | G01C 21/3492 701/533 |
| 2011/0054779 A1* | 3/2011 | Kim | G01C 21/3484 701/533 |
| 2011/0112747 A1* | 5/2011 | Downs | G08G 1/0104 701/118 |
| 2011/0238457 A1* | 9/2011 | Mason | G01C 21/3469 705/7.14 |
| 2011/0264366 A1* | 10/2011 | Cabral | G01C 21/3415 701/533 |
| 2014/0129139 A1* | 5/2014 | Ellison | G01C 21/3469 701/533 |
| 2014/0156189 A1 | 6/2014 | Hart et al. | |
| 2014/0278027 A1* | 9/2014 | Burke | G08G 1/22 701/117 |
| 2015/0286960 A1* | 10/2015 | Habibi | G06Q 10/02 705/5 |
| 2016/0223337 A1* | 8/2016 | Uno | G01C 21/3407 |
| 2016/0307446 A1* | 10/2016 | Edakunni | G08G 1/13 |
| 2016/0320197 A1* | 11/2016 | Beyeler | G01C 21/3682 |
| 2017/0059342 A1* | 3/2017 | Rajendran | H04W 24/02 |
| 2017/0227367 A1* | 8/2017 | Thangaraj | G06Q 30/0631 |

* cited by examiner

ROUTE RECOMMENDATION IN MAP SERVICE

BACKGROUND

The present invention relates to information processing, and more specifically, to map service.

Today, map service on computing devices, e.g., cell phones, GPS navigation devices and portable computers, is widely used all over the world, and route recommendation is one of the most popular functions of the map service. Many searching algorithms, such as Dijkstra's algorithm, Bellman-Ford algorithm, A* search algorithm, Floyd-Warshall algorithm, Johnson's algorithm and Viterbi algorithm, have been developed to facilitate searching of the optimal route between an origin and a destination. Due to the requirement for quick response and high concurrency for route recommendation in the map service, heuristic algorithms are usually used for route recommendation. However, in most cases, heuristic algorithms cannot guarantee a theoretically optimal solution.

SUMMARY

Disclosed herein are embodiments of a computer-implemented method, a computing system and a computer program product for route recommendation.

According to one embodiment of the present invention, there is provided a computer-implemented method. The method may comprise identifying at least one intermediate point for traveling from an origin to a destination based on a user input. The method may further comprise determining one or more first recommended routes from the origin to the destination via the at least one intermediate point. The method may further comprise determining one or more second recommended routes from the origin to the destination without considering the at least one intermediate point. The method may further comprise in response to at least one of the first recommended routes being better than the second recommended routes, storing the at least one intermediate point associated with the origin and the destination.

According to another embodiment of the present invention, there is provided a computing system, which comprises a processor and a computer-readable memory coupled to the processor. The memory comprises instructions that when executed by the processor perform actions of: identifying at least one intermediate point for traveling from an origin to a destination based on a user input; determining one or more first recommended routes from the origin to the destination via the at least one intermediate point; determining one or more second recommended routes from the origin to the destination without considering the at least one intermediate point; and in response to at least one of the first recommended routes being better than the second recommended routes, storing the at least one intermediate point associated with the origin and the destination.

According to another embodiment of the present invention, there is provided a computer program product, which comprises a computer readable storage medium having program instructions embodied therewith. The program instructions are executable by a processor to cause the processor to identify at least one intermediate point for traveling from an origin to a destination based on a user input; determine one or more first recommended routes from the origin to the destination via the at least one intermediate point; determine one or more second recommended routes from the origin to the destination without considering the at least one intermediate point; and in response to at least one of the first recommended routes being better than the second recommended routes, store the at least one intermediate point associated with the origin and the destination.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and for completely conveying the scope of the present disclosure to those skilled in the art.

Figure 1:
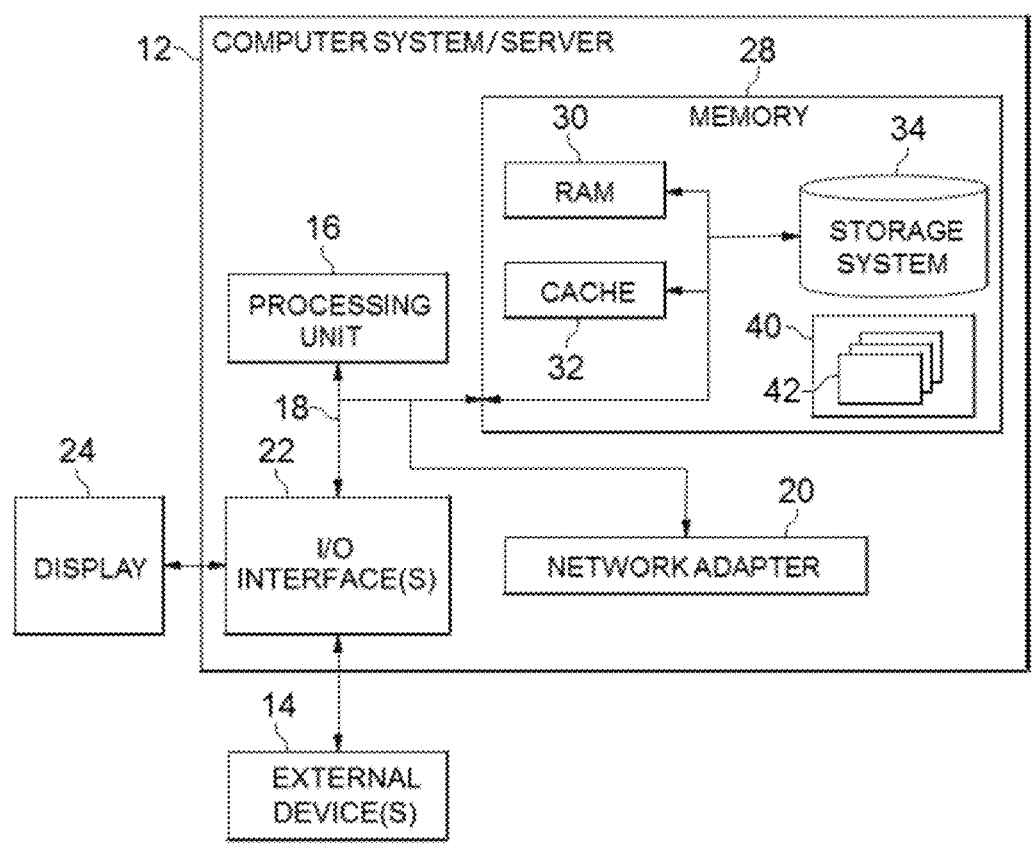
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be implemented in the computer system/server 12.

As mentioned above, in map service, heuristic algorithms are most popular for route recommendation but they cannot guarantee the best solution. Therefore, there is a need for improving the route recommendation in map service. Some recent developments use user feedback to improve the result of route recommendation. For example, the map service allows users to manually report traffic information or accident information to the server. In another example, the map service learns from actual trip history of the vehicle (e.g., based on GPS trajectories of the vehicle) to help recommend routes.

However, these techniques either need user's active feedback, which will burden user's operation, or highly rely on the recording and analysis of GPS data. Therefore, it would be desirable to provide an improved route recommendation method with seamless user experience and/or minimal reliance on GPS data analysis.

Figure 2:
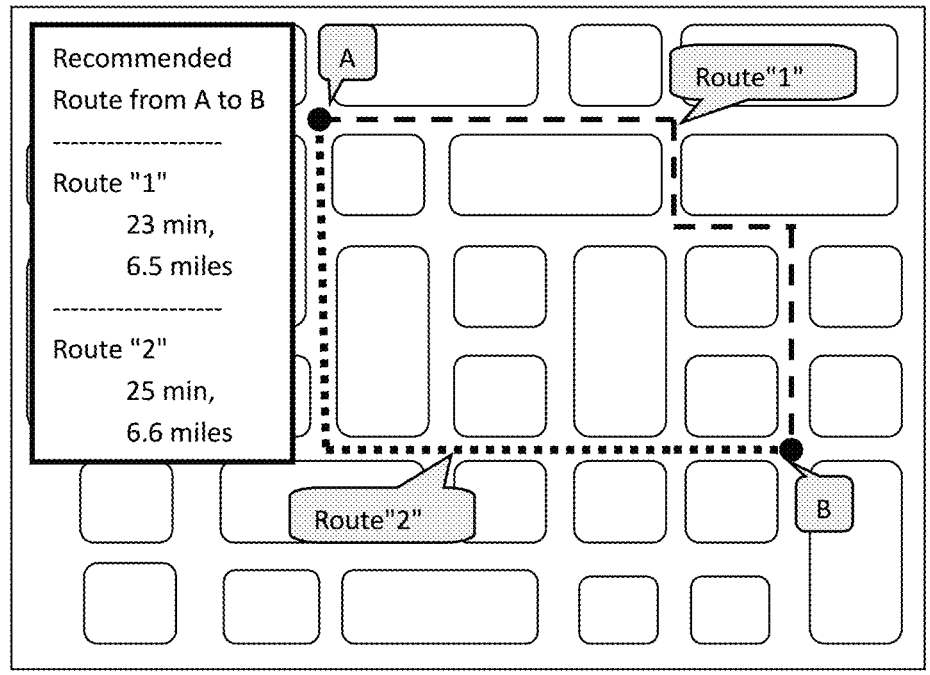
FIG. 2 is an exemplary drawing depicting the recommended routes from an origin to a destination.

With reference now to FIG. 2, FIG. 2 is an exemplary drawing depicting recommended routes by a conventional map service from an origin to a destination. The drawing as shown in FIG. 2 may represent a map on a web page of a map website, such as Google maps, Bing maps and MapQuest. Alternatively, the drawing as shown in FIG. 2 may represent a map on a user interface of a map application installed on a portable electronic device or a vehicle embedded device.

As shown in FIG. 2, point "A" is set as the origin and point "B" is set as the destination, and two recommended routes from the origin "A" to the destination "B", i.e., route "1" and route "2", are presented to the user using searching algorithm(s) of the map service. It would be appreciated that any known searching algorithm can be used here, and in order not to obscure the understanding of embodiments of the present invention, detailed descriptions about the searching algorithms are omitted in the specification.

As shown in FIG. 2, data related to each of the recommended routes are provided on the drawings. The data may comprise one or more of the estimated traveling duration, the traveling distance, the road/street/avenue(s) taken by the route, the estimated fuel/energy consumption, the estimated duration of waiting due to traffic congestion, the number of traffic lights to be passed, the toll to be paid, and so on. Based on the data, the user may select one of the recommended routes based on his/her preference. For instance, among the recommended routes, the user may normally select the route with the shortest travelling duration. For example, as shown in FIG. 2, the estimated traveling duration and the traveling distance are displayed on the left side of the drawing, and it can be seen that route "1" has a shorter traveling duration and thus is better than route "2" from the view of most users.

Figure 3:
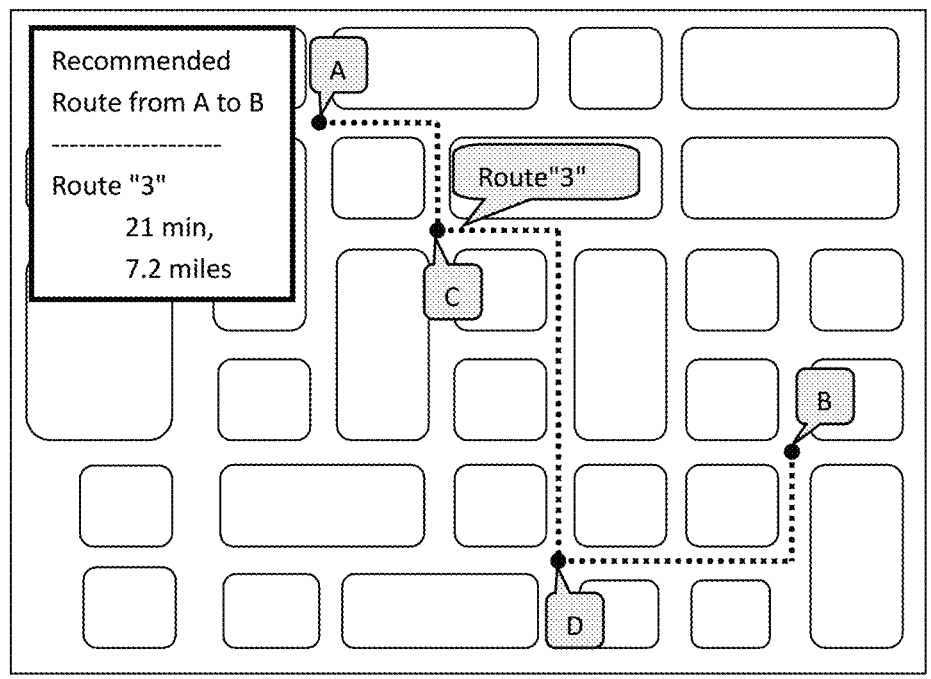
FIG. 3 is an exemplary drawing depicting the recommended routes from an origin to a destination via user-defined intermediate points.

Some map services provide a function of "add stop(s)" (or referred to as "add destination(s)" in some map applications) to the user, which allows the user to add one or more stops (or called intermediate points) to their navigation. The stops are intermediate points in a route between the origin and the destination and passed by the user during the traveling. FIG. 3 shows an example of using "add stop(s)" function.

FIG. 3 is an exemplary drawing depicting the recommended route from the same origin to the same destination as FIG. 2 but via user-defined intermediate points (or stops). As shown in FIG. 3, two intermediate points "C" and "D" are added by the user, and one recommended route from the origin "A" to the destination "B" via the intermediate points "C" and "D", i.e., route "3", is provided to the user using the searching algorithm(s) of the map service. As mentioned above, the data related to the recommended route via the intermediate points can be displayed on the left side of the drawing.

Although in most cases, route "3" takes more time than routes "1" and "2", sometimes it is not the case, as shown in FIG. 3. In this example, although route "3" has a longer distance than route "1" and route "2", it has a shorter traveling duration. In other words, with the intermediate points added, the calculated route may be even better than those recommended by the map service without this "intermediate point" limitation.

This may sometimes happen due to the limitation of commonly used heuristic algorithms and/or due to the tradeoff between optimization and computation. The recommendation by the map service may not be optimal, especially in the case having complicated traffic conditions, complicated weather conditions, or large height variation during the traveling. Moreover, some experienced drivers who drive frequently between the origin and the destination may know a better route than those recommended by the map service, and they may intentionally use the "add stop(s)" function to add intermediate point(s) for a better direction.

In consideration of the above, a method is provided to improve route recommendation by leveraging users' operations when using the map service.

Figure 4:
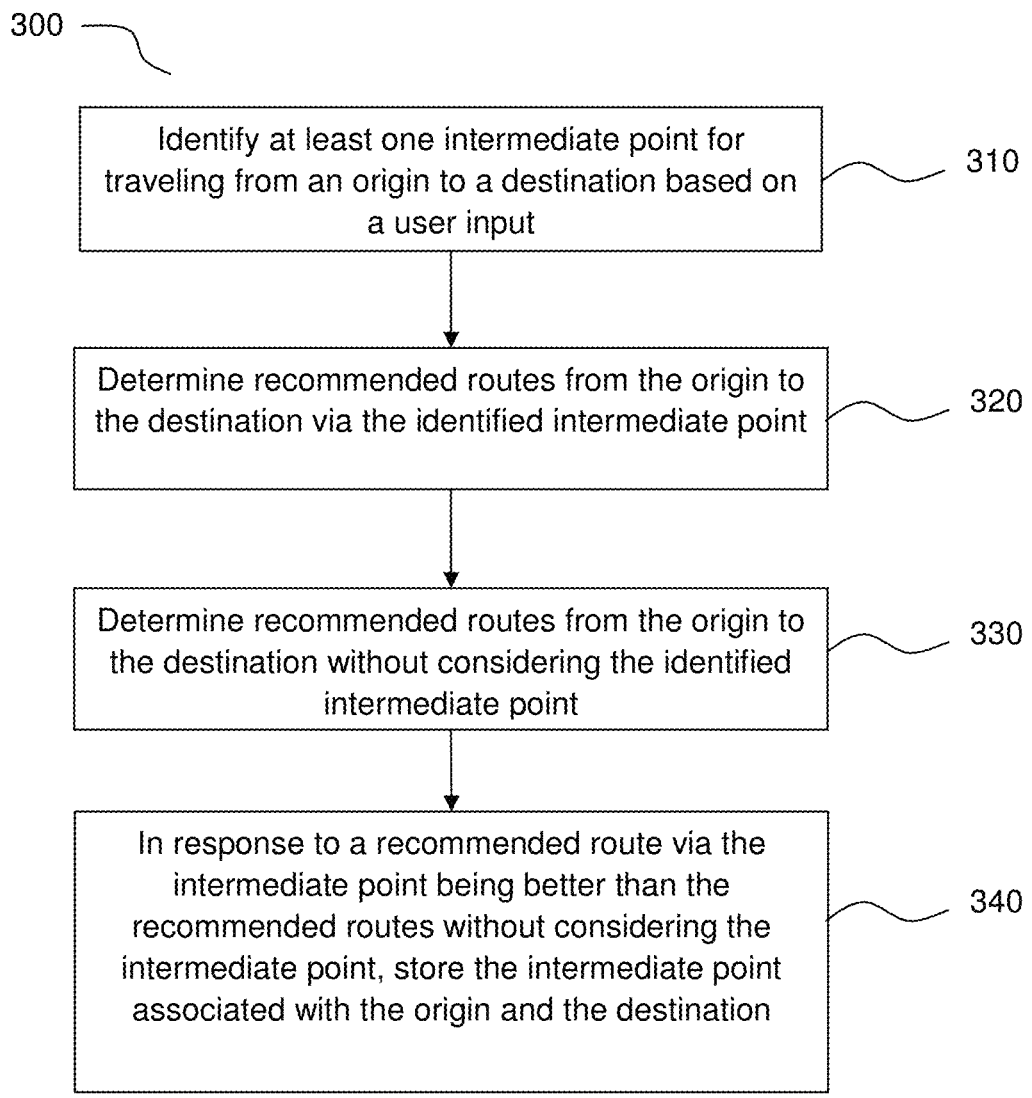
FIG. 4 is a flowchart illustrating an exemplary method according to an embodiment of the present invention.

Now refer to FIG. 4, which is a flowchart illustrating an exemplary method 300 according to an embodiment of the present invention.

At block 310, at least one intermediate point for traveling from an origin to a destination is identified e.g., by the map service, based on a user input. It would be appreciated that, the terms "origin", "destination" and "intermediate point" used here may refer to a location, an area, a road/street/avenue, a block, etc., which is not limited to an exact point on the map.

According to an embodiment, the user input can be an operation by the user on the map. For example, the user may tap on the map using a pointing device or finger on a touch screen. As another example, the user may drag a point on an existing route on the map to a new location. Alternatively, or in addition, the user may enter address information.

Based on the user input, the map service may identify the intermediate point. In an embodiment, the user input may input a precise location and the map service may identify the intermediate point directly based on the user input. In another embodiment, the user may input an approximate or incomplete address or indicate a rough area on the map, and the map service may identify the intermediate point by analyzing the user input and determining an appropriate location. For example, the user may enter an incomplete name of a shopping mall, and the map service may identify an intermediate point closest to the entrance of the mall.

According to an embodiment, the origin and/or the destination can also be determined based on one or more user inputs similar to the way of identifying the intermediate points. According to another embodiment, the origin and/or the destination can be automatically determined without user input. For example, the origin and/or the destination can be the location of the user, which is determined according to, e.g., GPS information or IP information of the portable electronic device carried by the user.

It would be appreciated that there is no limitation to the user input for identifying the intermediate points or to the determination of the origin and the destination.

At block 320, one or more recommended routes from the origin to the destination via the at least one identified intermediate point is determined. An example is shown in FIG. 3. At block 330, one or more recommended routes from the origin to the destination without considering the at least one identified intermediate point is determined. An example is shown in FIG. 2. Both the routes via the intermediate point and the routes without considering the intermediate point can be determined using any searching algorithm, which is not limited. For example, the determination can be made using regular searching algorithms just as the conventional map services do. It should be noted that, although FIG. 4 shows block 330 as following block 320, block 330 can alternatively be performed prior to block 320, prior to block 310, or concurrently with block 310 or block 320.

At block 340, in response to at least one of the recommended routes via the intermediate point being better than the recommended routes without considering the intermediate point, the at least one intermediate point identified at block 310 is stored associated with the origin and the destination. Thus, the stored at least one intermediate point is associated with a pair of origin and destination, and can be used in future route recommendation related to the pair of origin and destination by the map service. In an embodiment, the at least one intermediate point associated with the pair of origin and destination can be stored as an intermediate point set.

It can be seen that, in method 300, only regular operations, e.g., inputting origin, destination and intermediate points, are performed by the user and no additional user effort is required. Moreover, method 300 can be done without monitoring or recording actual travelling routes of users and thus is simple and flexible. Further, since blocks 320 and 330 are similar to the calculations by the map service for normal route recommendation, the computation will not increase significantly.

The route via the intermediate points can be considered as better than the route without considering the intermediate points in many aspects. For example, the route via the intermediate points can be considered as better if it has a shorter traveling duration. As another example, the route via the intermediate points can be considered as better if it has less energy consumption.

In an embodiment of the present invention, the context in determining the routes via the intermediate point can also be stored as a tag for the stored intermediate point set. The term "context" may refer to the environmental factors when the routes via the intermediate point are determined, and it may comprise a variety of information. For example, the context may comprise at least one of: time of day, day of week, rush hour or not, holiday or not, weather condition, and so on. It may indicate the environmental conditions when the route via user-defined intermediate point is better and help future recommendation.

According to an embodiment, the context to be collected and stored may depend on predefined environmental factors, which can be set and adjusted. For example, a large number of environmental factors can be set in order to collect environment information as much as possible. Alternatively, only a few environmental factors can be set to selectively collect part of the whole environment information.

Method 300 may be performed each time one or more intermediate points are added by a user, such that favorable intermediate point sets obtained from different users can be stored for later use to improve route recommendation. In this way, a plurality of intermediate point sets may be stored, e.g., in a group, for a specific pair of origin and destination. In an embodiment of the invention, in the case that the context in determining the routes via the intermediate point is stored as a tag, the intermediate point sets for the same pair of origin and destination and having the same tag can be associated with each other. For example, the intermediate point sets for the same pair of origin and destination but having different tags can be stored in different groups, with each group associated with a tag.

According to an embodiment, the plurality of intermediate point sets in a group can be ranked such that the intermediate point set which defines a better route ranks higher. A variety of factors can be used to rank the intermediate point sets. For instance, the intermediate point sets can be ranked according to at least one of the following: the calculated traveling duration of the corresponding route, the calculated energy consumption of the corresponding route, the time elapsed since the intermediate point set was stored, and so on. As an example, in the case where the calculated traveling duration of the corresponding route is considered for the ranking, an intermediate point set corresponding to a route with shorter calculated traveling duration may rank higher in the group. Alternatively, or in addition, in the case where the time elapsed since the intermediate point set was stored is considered for the ranking, the newly stored intermediate point set may rank higher in the group. According to an embodiment, the calculated traveling duration and/or calculated energy consumption may be those calculated when determining recommended route (e.g., block 320 of FIG. 4) before the intermediate point set was stored (e.g., block 340 of FIG. 4), and may be stored along with the intermediate point set. Alternatively, each time a new intermediate point set is added into the group, the traveling durations and/or energy consumptions for the intermediate point sets in the group can be calculated for ranking.

In an embodiment of the present invention, the rank of each intermediate point set can be determined according to only one factor. For example, the rank of each intermediate point set may solely depend on the calculated traveling duration thereof.

In another embodiment of the present invention, the rank of each intermediate point set can be determined according to two or more factors. For example, each factor may be assigned a weight and a rank score may be calculated for each intermediate point set accordingly. As a more specific example, the rank score considering the calculated traveling duration of the corresponding route and the time elapsed since the intermediate point set was stored can be calculated as follows:

Rank score=calculated traveling duration*(1+ 0.01*$t\_fresh$), wherein "t_fresh" refers to the number of weeks since the intermediate point set was stored, and the value "0.01" represents the weight assigned to "t_fresh".

In an embodiment of the invention, only the intermediate point sets having relative high rank scores are stored in the group for a pair of origin and destination to save storage space. For example, only ten intermediate point sets having the highest rank scores are stored. Accordingly, in the case that ten intermediate point sets have already been stored, a new intermediate point set will be stored only if its rank store is higher than the tenth-highest stored intermediate point set, and in this case, the tenth-highest stored intermediate point set will be deleted.

With the method 300 being performed, when a user of the map service, either the same user or another user, makes a search request for a route from the vicinity of the origin to the vicinity of the destination, the routes recommended using the stored intermediate point sets can be considered as potential results of the search request.

Figure 5:
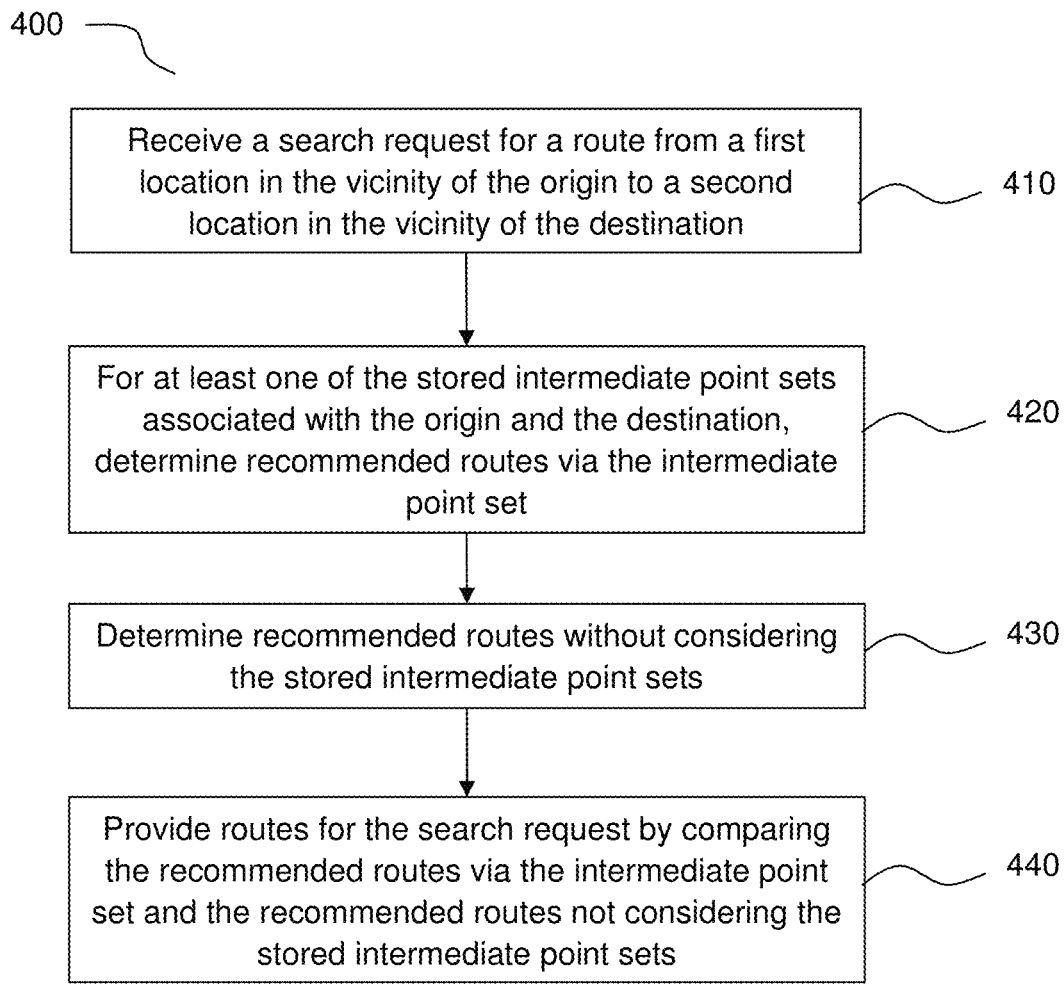
FIG. 5 is a flowchart illustrating an exemplary method according to an embodiment of the present invention.

Below, the process of recommending routes using the stored intermediate point sets associated with the origin and the destination will be described by referring to FIG. 5. FIG. 5 is a flowchart illustrating an exemplary method 400 according to an embodiment of the present invention.

At block 410, a search request for a route from a first location in the vicinity of the origin to a second location in the vicinity of the destination is received. The vicinity of the origin/destination can be a predetermined range from the origin/destination, or can be determined according to a map grid (which will be described in more detail with reference to FIG. 7), such that the first/second location may be the same as the origin/destination or near the origin/destination.

At block 420, for at least one of the stored intermediate point sets associated with the origin and the destination, one or more recommended routes from the first location to the second location via the intermediate point set (i.e., via all the intermediate points in the intermediate point set) are determined. The determination may be made using any searching algorithm, which is not limited. In an embodiment, not all the stored intermediate point sets are used, and only some of them, for example, 3 or 5 intermediate point sets ranking higher than the others, are retrieved and used. In another embodiment of the invention, all the stored intermediate point sets associated with the origin and the destination can be retrieved and used.

At block 430, one or more recommended routes from the first location to the second location without considering the stored intermediate point sets are determined. The determination may be made using any searching algorithm, which is not limited. It should be noted that, although FIG. 5 shows block 430 as following block 420, block 430 can alternatively be performed prior to block 420, prior to block 410, or concurrently with block 410 or block 420.

At block 440, one or more routes for the search request can be provided as the final result by comparing the recommended routes determined at block 420 and the recommended routes determined at block 430. The comparison may be made in terms of many aspects. For example, a route having the shortest traveling duration can be selected as the final result. As another example, a route having the minimum energy consumption can be selected as the final result. In an embodiment, there may be several routes presented to the user for his/her choice, with each route performing best in one aspect. In another embodiment, the recommended routes determined at blocks 420 and 430 can be ordered from the most recommended route to the least recommended route, and the first one or several (e.g., 2-5) of them may be provided to the user.

If no intermediate point set has been stored for the destination and the origin yet, the process carried out in block 420 can be skipped, and at block 440, the recommended routes without considering the stored intermediate point sets will be provided for the search request.

In the case that a tag has been stored for the intermediate point set to indicate the context for the process of method 300, context of the search request at block 410 can also be determined, and only the intermediate point sets having the tag matching the context of the search request are retrieved and used. For example, if the search request seeks a route during the evening rush hour, only the stored intermediate point sets which were determined during the evening rush hour (i.e., having a corresponding tag indicating the evening rush hour) are retrieved and used. Thus, the use of tag may identify the similarity between the search request and the stored intermediate point sets and further improve the route recommendation.

Figure 6:
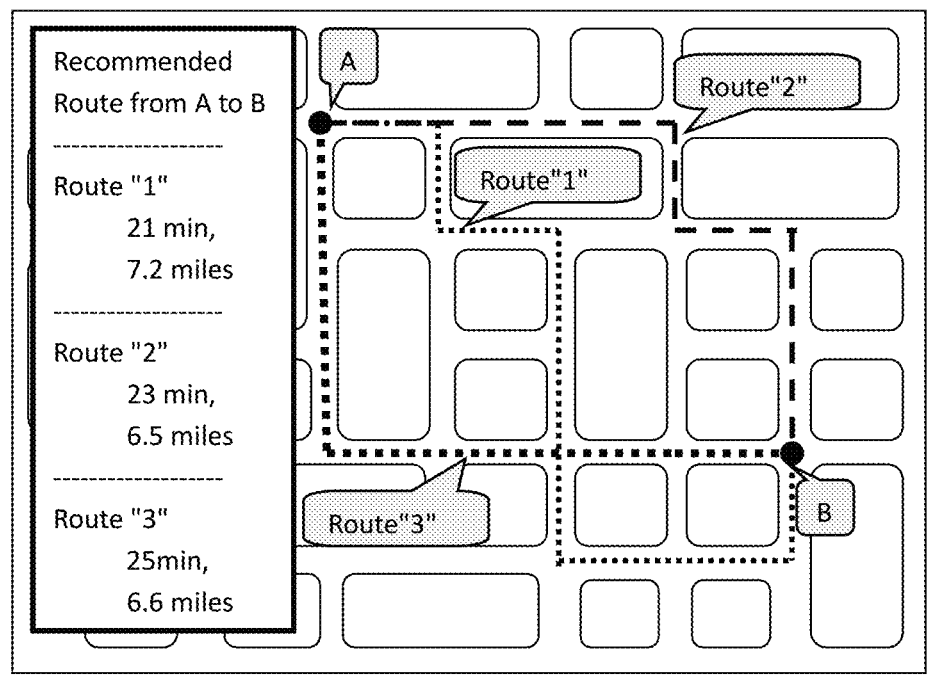
FIG. 6 is an exemplary drawing depicting the recommended routes from an origin to a destination according to an embodiment of the present invention.

Now referring to FIG. 6, FIG. 6 is an exemplary drawing depicting the recommended routes from an origin to a destination according to an embodiment of the present invention. In FIG. 6, point "A" is the origin, which may correspond to the first location at block 410 of FIG. 5, and point "B" is the destination, which may correspond to the second location at block 410 of FIG. 5. Moreover, at least one intermediate point set was previously stored associated with a pair of origin and destination in the vicinity of points "A" and "B" respectively. As shown in FIG. 6, with the process of method 400 being performed, one recommended route determined using the previously stored intermediate points (route "1") and two recommended routes determined without considering the stored intermediate point sets (route "2" and route "3") are selected and provided to the user. As shown in the left column of FIG. 5, route "1" is at the top of the list of recommended routes, since it is the fastest. However, route "1" may also be located at the second or third place if route "2" or "3" is faster than it according to the calculation result of the searching algorithm.

In an embodiment of the present invention, the locations of the points on the map, such as the origin, the destination and the intermediate points, can be defined by their exact geographical locations, such as the latitude and longitude of each point.

In another embodiment of the present invention, a map grid can be created to indicate the locations of the points on the map. For example, the map can be divided into blocks, and every point on the map belongs to a map block and can be represented by the map block. The block comprising the origin may be referred to as "origin block", and the block comprising the destination may be referred to as "destination block." Accordingly, an intermediate point set stored for the origin and the destination may be associated with the pair of origin block and destination block. Moreover, the stored intermediate point set can be used for a search request with any point in the origin block as an origin and any point in the destination block as a destination. In this way, the storage space for the intermediate point sets can be reduced.

Figure 7:
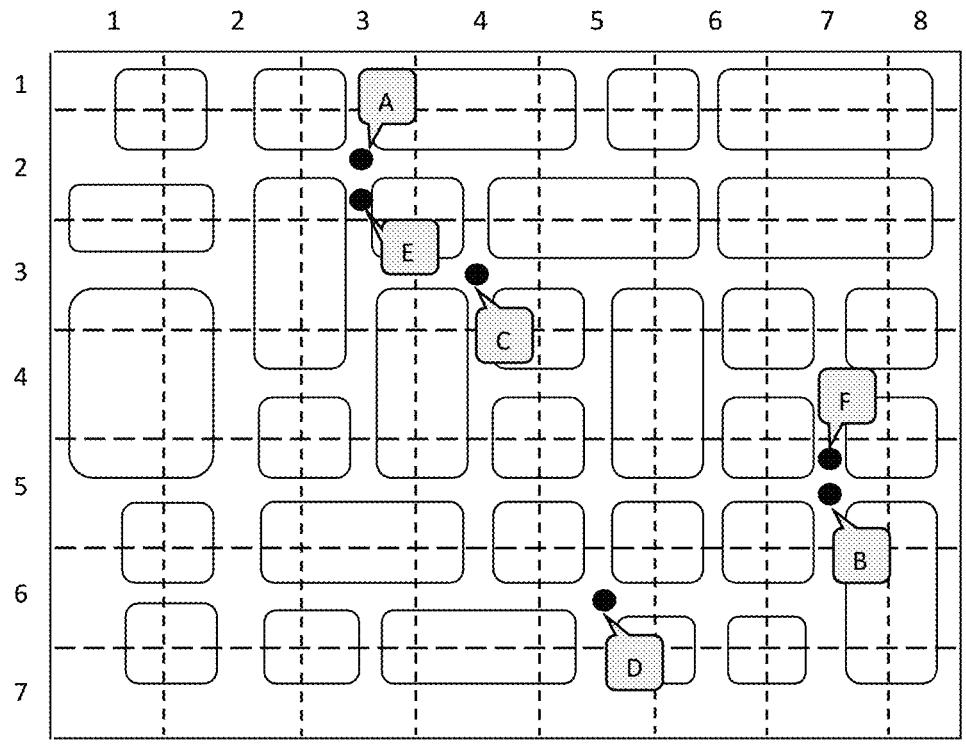
FIG. 7 shows an exemplary map grid according to an embodiment of the present invention.

FIG. 7 shows an exemplary map grid according to an embodiment of the present invention. As shown in FIG. 7, the map is divided into an 8×7 grid. Points "A" and "B" belong to blocks (3, 2) and (7, 5), respectively, and can be considered as being represented by blocks (3, 2) and (7, 5), respectively. An intermediate point set comprising point "C" and point "D" (i.e., the intermediate point set (C, D)) was stored due to the good calculated performance of the route from point "A" to point "B" via points "C" and "D". So, the stored intermediate point set (C, D) is associated with a pair of origin block (3, 2) and destination block (7, 5). As shown in FIG. 7, points "A" and "E" belong to the same block (3, 2), and points "B" and "F" belong to the same block (7, 5). Then the intermediate point set (C, D) can be also used for a search request for a route from point "E" to point "F", from point "A" to point "F", or from point "E" to point "B".

As shown in FIG. 7, the intermediate points "C" and "D" belong to blocks (4, 3) and (5, 6), respectively. In an embodiment of the present invention, similar to the origin and the destination, the stored intermediate points can be represented by the blocks which they belong to.

However, in another embodiment of the present invention, the stored intermediate points can be represented by their exact positions in the map grid, and then the intermediate points "C" and "D" are stored as, for example, (4.5, 3.5) and (5.5, 6.5), respectively. The exact position of the stored intermediate point may facilitate the determination of recommended routes via the intermediate point.

Although FIG. 7 shows the map grid with equal-sized blocks, the map can alternatively be divided into unequal-sized blocks according to, e.g., the density of roads within each area of the map. For example, for an area in which the density of roads is high, the block size may be small, while for an area in which the density of roads is low, the block size may be large, so as to balance the accuracy and efficiency of route recommendation.

The present invention may be implemented as a system, a method, and/or a computer program product. The computer program product may include a computer readable storage medium (or media) having computer readable program instructions thereon for causing a processor to carry out aspects of the present invention.

According to an embodiment of the present invention, there is provided a computing system, which comprises a processor and a computer-readable memory coupled to the processor. The memory comprises instructions that when executed by the processor perform actions of: identifying at least one intermediate point for traveling from an origin to a destination based on a user input; determining one or more first recommended routes from the origin to the destination via the at least one intermediate point; determining one or more second recommended routes from the origin to the destination without considering the at least one intermediate point; and in response to at least one of the first recommended routes being better than the second recommended routes, storing the at least one intermediate point associated with the origin and the destination.

According to an embodiment of the computing system, the memory unit further comprises instructions that when executed by the processor perform actions of in response to at least one of the first recommended routes being better than the second recommended routes, storing context in determining the one or more first recommended routes as a tag for the stored at least one intermediate point.

According to an embodiment of the computing system, the at least one intermediate point is stored as an intermediate point set, and the memory further comprises instructions that when executed by the processor perform actions of: ranking the intermediate point set among stored intermediate point sets associated with the origin and the destination according to at least one of following: calculated travelling duration of the first recommended route, calculated energy consumption of the first recommended route, and time elapsed since the intermediate point set was stored.

According to an embodiment of the computing system, the at least one intermediate point is stored as an intermediate point set, and the memory further comprises instructions that when executed by the processor perform actions of: in response to a search request for a route from a first location in the vicinity of the origin to a second location in the vicinity of the destination, recommending one or more routes for the search request using stored intermediate point sets associated with the origin and the destination.

According to an embodiment of the computing system, recommending the one or more routes for the search request comprises: for at least one of the stored intermediate point sets associated with the origin and the destination, determining one or more third recommended routes from the first location to the second location via the intermediate point set; determining one or more fourth recommended routes from the first location to the second location without considering the stored intermediate point sets; and providing the one or more routes for the search request by comparing the third recommended routes and the fourth recommended routes.

According to an embodiment of the computing system, each of the at least one of the stored intermediate point sets associated with the origin and the destination has a tag matching context of the search request, wherein the tag for the stored intermediate point set indicates context in determining corresponding recommended routes.

According to an embodiment of the present invention, there is provided a computer program product, which comprises a computer readable storage medium having program instructions embodied therewith. The program instructions are executable by a processor to cause the processor to: identify at least one intermediate point for traveling from an origin to a destination based on a user input; determine one or more first recommended routes from the origin to the destination via the at least one intermediate point; determine one or more second recommended routes from the origin to the destination without considering the at least one intermediate point; and in response to at least one of the first recommended routes being better than the second recommended routes, store the at least one intermediate point associated with the origin and the destination.

According to an embodiment of the computer program product, the program instructions executable by the processor further cause the processor to: in response to at least one of the first recommended routes being better than the second recommended routes, store context in determining the one or more first recommended routes as a tag for the stored at least one intermediate point.

According to an embodiment of the computer program product, the at least one intermediate point is stored as an intermediate point set, and the program instructions executable by the processor further cause the processor to: rank the intermediate point set among stored intermediate point sets associated with the origin and the destination according to at least one of following: calculated travelling duration of the first recommended route, calculated energy consumption of the first recommended route, and time elapsed since the intermediate point set was stored.

According to an embodiment of the computer program product, the at least one intermediate point is stored as an intermediate point set, and the program instructions executable by the processor further cause the processor to: in response to a search request for a route from a first location in the vicinity of the origin to a first location in the vicinity of the destination, recommend one or more routes for the search request using stored intermediate point sets associated with the origin and the destination.

According to an embodiment of the computer program product, recommending the one or more routes for the search request comprises: for at least one of the stored intermediate point sets associated with the origin and the destination, determining one or more third recommended routes from the first location to the second location via the intermediate point set; determining one or more fourth recommended routes from the first location to the second location without considering the stored intermediate point sets; and providing the one or more routes for the search request by comparing the third recommended routes and the fourth recommended routes.

According to an embodiment of the computer program product, each of the at least one of the stored intermediate point sets associated with the origin and the destination has a tag matching context of the search request, wherein the tag for the stored intermediate point set indicates context in determining corresponding first recommended routes.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, by a processor, a plurality of intermediate points for traveling from an origin to a destination based on a plurality of user inputs received from a plurality of mobile devices, at least one intermediate point having been intentionally input by a user via an "add stop" function;
   determining, by the processor, a plurality of recommended routes from the origin to the destination via the plurality of intermediate points;
   storing, in a computer memory, each recommended route along with the intermediate point used to determine the recommended route and an associated tag, wherein the associated tag includes a corresponding origin, destination and context used in determining the recommended route;
   associating, by the processor, stored recommended routes having a same tag into groups of recommended routes;
   ranking, by the processor, the recommended routes within each group of recommended routes based on a plurality of factors;
   receiving a search request for a route from a first location to a second location, the search request having associated context; and
   in response to receiving the search request for a route from the first location to a second location:
      determining, by the processor, a group of recommended routes from the stored groups of recommended routes wherein the first location is within a first predetermined distance from the corresponding origin, the second location is within a second predetermined distance from the corresponding destination, and the associated context matches the context of the tag of the determined group; and
      recommending, by the processor the one or more routes of the determined group by displaying, via graphical user interface (GUI) using a map service, the one or more recommended routes of the determined group according to ranking.

2. The method of claim 1, wherein the recommended routes within each group of recommended routes are ranked by at least one factor of the group comprising: traveling duration and cost of tolls.

3. The method of claim 2, wherein the recommended routes within each group of recommended routes are further ranked by time elapsed since the recommended route and its corresponding intermediate point was stored.

4. The method of claim 2 wherein each factor is weighted.

5. The method of claim 1, wherein the context comprises at least one of: time of day, day of week, rush hour or not, holiday or not, and weather condition.

6. The method of claim 1, wherein at least one of within the first predetermined distance from the origin and within the second predetermined distance from the destination is determined according to a map grid.

7. A computing system, comprising:
   a processor;
   a computer-readable memory coupled to the processor, the memory comprising instructions that when executed by the processor perform actions of:
      identifying a plurality of intermediate points for traveling from an origin to a destination based on a plurality of user inputs received from a plurality of mobile devices, at least one intermediate point having been intentionally input by a user via an "add stop" function;
      determining a plurality of recommended routes from the origin to the destination via the plurality of intermediate points;
      storing, in the memory, each recommended route along with the intermediate point used to determine the recommended route and an associated tag, wherein the associated tag includes a corresponding origin, destination and context used in determining the recommended route;

associating stored recommended routes having a same tag into groups of recommended routes;

ranking the recommended routes within each group of recommended routes based on a plurality of factors;

receiving a search request for a route from a first location to a second location, the search request having associated context; and in response to receiving the search request for a route from the first location to a second location:
  determining a group of recommended routes from the stored groups of recommended routes wherein the first location is within a first predetermined distance from the corresponding origin, and the second location is within a second predetermined distance from the corresponding destination, and the associated context matches the context of the tag of the determined group; and
  recommending the one or more routes of the determined group by displaying, via a graphical user interface using a map service, the one or more recommended routes of the determined group according to ranking.

8. The computing system of claim 7, wherein the recommended routes within each group of recommended routes are ranked by at least one factor of the group comprising: traveling duration and cost of tolls.

9. The computing system of claim 8, wherein the recommended routes within each group of recommended routes are further ranked by time elapsed since the recommended route and its corresponding intermediate point was stored.

10. The computing system of claim 8, wherein each factor is weighted.

11. The computing system of claim 7, wherein at least one of within the first predetermined distance from the origin and within the second predetermined distance from the destination is determined according to a map grid.

12. The computing system of claim 7, wherein the context comprises at least one of: time of day, day of week, rush hour or not, holiday or not, and weather condition.

13. A computer program product, comprising a non-transitory computer readable storage medium having program instructions embodied therewith, the program instructions executable by a processor to cause the processor to:
  identify a plurality of intermediate points for traveling from an origin to a destination based on a plurality of user inputs received from a plurality of mobile devices, at least one intermediate point having been intentionally input by a user via an "add stop" function;

determine a plurality of recommended routes from the origin to the destination via the plurality of intermediate points;

store each recommended route along with the intermediate point used to determine the recommended route and an associated tag, wherein the associated tag includes a corresponding origin, destination and context used in determining the recommended route;

associate stored recommended routes having a same tag into groups of recommended routes;

rank the recommended routes within each group of recommended routes based on a plurality of factors;

receive a search request for a route from a first location to a second location, the search request having associated context; and in response to receiving the search request for a route from the first location to a second location:
  determine a group of recommended routes from the stored groups of recommended routes wherein the first location is within a first predetermined distance from the corresponding origin, the second location is within a second predetermined distance from the corresponding destination, and the associated context matches the context of the tag of the determined group; and
  recommend the one or more routes of the determined group by displaying, via a map service, the one or more recommended routes of the determined group according to ranking.

14. The computer program product of claim 13, wherein the recommended routes within each group of recommended routes are ranked by at least one factor of the group comprising: traveling duration and cost of tolls.

15. The computer program product of claim 14, wherein the recommended routes within each group of recommended routes are further ranked by time elapsed since the recommended route and its corresponding intermediate point was stored.

16. The computer program product of claim 14, wherein each factor is weighted.

17. The computer program product of claim 13, wherein at least one of within the first predetermined distance from the origin and within the second predetermined distance from the destination is determined according to a map grid.

18. The computer program product of claim 13, wherein the context comprises at least one of: time of day, day of week, rush hour or not, holiday or not, and weather condition.

* * * * *